(12) United States Patent
Pope

(10) Patent No.: US 7,537,638 B2
(45) Date of Patent: May 26, 2009

(54) METALLURGICAL SLAG

(76) Inventor: Peter Geoffrey Pope, Spurvyns, Bexon Lane, Bedgar, Kent (GB) ME9 8HB (*) Notice: Subject to any disclaimer, the term of this patent is extended or adjusted under 35 U.S.C. 154(b) by 0 days.

(21) Appl. No.: 10/514,456

(22) PCT Filed: May 13, 2003

(86) PCT No.: PCT/GB03/02051

§ 371 (c)(1), (2), (4) Date: Nov. 15, 2004

(87) PCT Pub. No.: WO03/097881

PCT Pub. Date: Nov. 27, 2003

(65) Prior Publication Data

US 2005/0229745 A1  Oct. 20, 2005

(30) Foreign Application Priority Data

May 15, 2002  (GB) ................... 0211154.0

(51) Int. Cl.
*C21B 3/02* (2006.01)
*C22B 7/04* (2006.01)
(52) U.S. Cl. ........................... 75/560; 65/19
(58) Field of Classification Search .......... 75/327, 75/709, 329, 303
See application file for complete search history.

(56) References Cited

U.S. PATENT DOCUMENTS

| | | | |
|---|---|---|---|
| 4,137,071 A * | 1/1979 | Mrdjenovich | 75/579 |
| 5,493,580 A * | 2/1996 | Fudala | 75/10.61 |
| 6,306,248 B1 * | 10/2001 | Eley | 162/4 |
| 6,553,924 B2 * | 4/2003 | Beaumont et al. | 110/238 |
| 6,773,486 B2 * | 8/2004 | Vayda | 75/709 |

FOREIGN PATENT DOCUMENTS

| | | | |
|---|---|---|---|
| EP | 0055953 | | 7/1982 |
| FR | 2117723 | | 7/1972 |
| GB | 1495195 | | 12/1977 |
| JP | 52104409 A | * | 9/1977 |
| JP | 54127818 | | 10/1979 |
| JP | 57161017 A | * | 10/1982 |
| JP | 58044947 | | 3/1983 |
| JP | 63302932 A | * | 12/1988 |
| JP | 08269521 A | * | 10/1996 |
| JP | 2002-053910 | * | 2/2002 |
| JP | 2002-97514 | | 4/2002 |
| JP | 2002 097514 | | 4/2002 |
| JP | 2002 130645 | | 5/2002 |
| KR | 2001-0012132 A | * | 12/2001 |
| SU | 001353822 | | 11/1987 |
| SU | 001768348 | | 10/1992 |
| WO | 96/07054 A1 | | 3/1996 |
| WO | 96/17963 | | 6/1996 |

OTHER PUBLICATIONS

Abstract of KR 2001112132.*
Machine translation of JP 2002-053910.*
Machine translation to English of Korean patent document 10-2001-0112132.*
International Search Report re PCT/GB 03/02051 mailed Sep. 1, 2003.
Ruth Engel, Ronald Marr, Eugene Pretorius, "Refactory/Slag Systems for Ladles and Secondary Refining Processes," Iron and Steelmaker, Apr. 1996-Sep. 1997.

* cited by examiner

*Primary Examiner*—Roy King
*Assistant Examiner*—Tima M McGuthry-Banks
(74) *Attorney, Agent, or Firm*—Caesar, Rivise, Bernstein, Cohen & Pokotilow, Ltd.

(57) ABSTRACT

A method of making a material for use as a steel-making slag comprises mixing sufficient lime and/or magnesia containing materials with combustion ash until the so-formed composition has a basicity ratio appropriate for use in steel making.

2 Claims, No Drawings

METALLURGICAL SLAG

BACKGROUND OF THE INVENTION

This invention relates to slag, specifically to that used in the steel-making industry.

A slag is present on the top of the melt in a metallurgical furnace or vessel. The main function of the slag is to combine with unwanted impurities from the melt so that they can be separated from the melt. It also tends to prevent the melt from picking up gases from the furnace atmosphere.

It is known that the so-called basicity ratio of the slag is important in steel-making. The basicity ratio is defined as the ratio of basic oxides to acidic oxides.

One measure of the basicity ratio (B) is defined thus:

$$B = \frac{\% \text{ CaO} + \% \text{ MgO}}{\% \text{ SiO}_2 + \% \text{ Al}_2\text{O}_3}$$

Other, sometimes more useful, measures of the basicity ratio have been proposed (see Turkdogan E. T. *The Fundamentals of Steelmaking*; The Institute of Materials (1996)). Such measures may be expressed thus:

$$B_{LF} = \frac{\% \text{ CaO} + 1.4\% \text{ MgO}}{\% \text{ SiO}_2 + 0.6\% \text{ Al}_2\text{O}_3}$$

or $$V = \frac{\% \text{ CaO}}{\% \text{ SiO}_2}$$

Virgin slag compositions are slag compositions which are brought into contact with the melt at the commencement of the steel making process. The values for basicity ratios, as defined above, are typically above 2 for the so-called "virgin" slag compositions.

Care must be taken when using and referring to the basicity ratio as there are many ways of defining the basicity (see, for example, Sommerville, I. D. and Yindong Yang; *The AusIMM Proceedings*, pp. 71, Vol. 36 No. 1; 2001).

Furnaces used in the steel industry, for example Basic Oxygen Furnaces (BOFs), Electric Arc Furnaces (EAFs) and Ladle Furnaces (LFs) are metal vessels which have a refractory lining to hold the molten metal. The refractory materials are chosen to withstand the extreme temperatures to which they are subjected. It is important for reasons of economy and efficiency that damage to the refractory materials is minimised. Damage to such refractory materials is controlled by, inter alia, the basicity and by MgO saturation levels.

Many industries seek to gain extra benefit out of production processes by reclaiming waste materials. Such reclamation may take the form of recycling unused or partially used materials or the reclamation of say energy in the form of heat by combusting waste materials. One such industry is the paper production industry where the by-product, waste paper pulp or sludge, is often burnt. The product of the so-combusted waste is known as combustion ash.

Combustion ash from the paper production industry is typically a fine powder substantially composed of calcium oxide, silicon dioxide, aluminium oxide, magnesium oxide and iron oxide. Small amounts of other metallic oxides and chlorides are also usually present. Because of the physical composition and state of combustion ash it has heretofore had limited economic use and is typically land-filled. In many parts of Europe, at least, a charge is levied for the disposal and, say, land filling of industrial waste.

It is an object of the present invention to provide a cheap source of virgin slag, whilst providing an economic sink for combustion ash, thereby reducing land-fill and producing a further income stream. It is a further object of the invention to provide a so-called "artificial" slag made at least partially from waste materials. It is a yet further and more specific object of the invention to provide an artificial slag from waste materials which causes no, little or not excessive damage to the refractory materials used in steel-making processes.

SUMMARY OF THE INVENTION

Accordingly, a first aspect of the invention provides a method of making a material for use as a steel-making slag, the method comprising mixing sufficient lime and/or magnesia containing materials with combustion ash until the so-formed composition has a basicity ratio appropriate for use in steel making.

A further aspect of the invention provides a material for use as a slag in the steel-making industry, comprising a mixture of combustion ash and lime and/or magnesia containing materials and having a basicity ratio appropriate to the steel to be made and/or steel making process to be utilised.

Preferably, the ratio of add-mixed lime to combustion ash is from 1:2 to 2:1, calculated as parts by mass, but may be more or less depending on the composition of the combustion ash. The ratio of add-mixed magnesia to combustion ash is preferably no more than 1:4, more preferably no more than 1:5.

The basicity ratio (V) of the product may be advantageously adjusted to a range of from 2.0 to 9.0, depending upon the metallurgical requirements of the process in which the slag is intended to be used, by the addition of appropriate amounts of lime and/or magnesia containing materials.

The added or add-mixed lime and magnesia are preferably in either or both powder or granular form, most preferably each with a nominal diameter of less than 10 mm. The lime and magnesia may be separate components and/or may be in the form of dolomitic lime which may have a lime to magnesia ratio of about 3:1 and/or other materials rich in lime and/or magnesia.

It will be appreciated by those of skill in the art that the term 'lime', as used herein, typically refers to burnt lime (CaO). However, in special and rare situations, $CaCO_3$ may be used in addition, or as an alternative to, CaO.

A yet further aspect of the invention provides a method of generating artificial slag, the method comprising treating combustion ash to provide a material with a basicity ratio appropriate for use in steel making.

Preferably, the combustion ash is treated by adding substances thereto, for example lime and/or magnesia, or removing components thereof, for example silica and/or alumina.

A still further aspect of the invention provides the use of combustion ash as at least a part component of artificial slag for use in steel making.

DETAILED DESCRIPTION OF PREFERRED EMBODIMENTS OF THE INVENTION

In order that the invention may be more fully understood it will now be described with reference to the accompanying Examples.

Table 1, below, provides details of a typical composition of combustion ash. The range shown is typical of combustion ashes although some may vary outside of the ranges shown. All combustion ashes are considered to be suitable for use in the current invention.

As can be seen, Table 1 shows that the specific example of typical combustion ash has basicity ratio values which are too low to use it as a virgin slag.

TABLE 1

Typical Composition of Combustion Ash

| COMPONENT | Range (w/w %) |
|---|---|
| $SiO_2$ | 22-34 |
| $Al_2O_3$ | 15-22 |
| $Fe_2O_3$ | 0.7-1.3 |
| CaO | 37-47 |
| MgO | 4-6 |

EXAMPLE 1

To 100 parts by mass of the above-specified combustion ash were added and mixed 50 parts by mass of lime. The components were mixed to provide a substantially homogeneous mixture. The resultant mixture had basicity ratios, B of 2.1 $B_{LF}$ of 2.6 and V of 3.4. The mixture was found to be suitable as an artificial virgin slag material in the steel making industry.

EXAMPLE 2

To 100 parts by mass of the above-specified combustion ash were added and mixed 200 parts by mass of lime and 20 parts by mass of magnesia. The components were mixed to provide a substantially homogeneous mixture. The resultant mixture had basicity ratios B of 5.8, $B_{LF}$ of 7.1 and a basicity ratio V of 8.4 by calculation. The mixture was found to be suitable as an artificial virgin slag material in the steel making industry.

EXAMPLE 3

To 100 parts by mass of the above-specified combustion ash were added and mixed 40 parts by mass of lime and 40 parts by mass of dolomitic lime (25% by mass magnesia, 75% by mass lime). The components were mixed to provide a substantially homogeneous mixture. The resultant mixture had basicity ratios B of 2.8, $B_{LF}$ of 3.4 and a basicity ratio V of 4.1. The mixture was found to be suitable as an artificial virgin slag material in the steel making industry.

The so-formed virgin artificial slag may be placed on top of or into the melt by means of a conveyor or the like, thereby drawing off the impurities from the melt. Alternatively, and due to the small particle size of the combustion ash, the so-formed virgin artificial slag may be entrained in, say, a gas stream and injected, pumped or otherwise forced into the melt below its' surface, so that it will remove impurities as it percolates or passes upwards.

The so-formed virgin artificial slag is useful in EAFs, BOFs and LFs or any vessel containing liquid steel and further can aid elemental phosphorus and sulphur removal from the steel (as $P_2O_5$ and CaS respectively) in, say, EAFs. Further, due to the presence of MgO in the artificial slag, the tendency for MgO to dissolve from the refractory materials used in the liners of such furnaces is reduced, thereby minimising damage to those refractory materials.

Whilst the above-identified Examples have indicated that the combustion ash and other substances are mixed prior to addition to the melt, it is also within the scope of this invention to add the combustion ash and lime and/or magnesia separately to the melt. Thus, lime, say, may be added to the melt and combustion ash added as a distinct component, the sum of the two parts forming a slag with a basicity ratio appropriate for use in steel making. One component may be forced into the melt below its surface and the other placed on top of the melt, both may be placed on top of the melt, or both may be forced into the melt below its surface.

It will be understood by the skilled man that the sum of lime and/or magnesia additions will be specific to a particular steel making application and even to a particular steel making plant, due to, inter alia, the production of oxides during the steel making process which also go to form part of the slag. Thus, the initial basicity ratio will be adjusted and selected to accommodate the impurities produced in the furnace, the quality of steel required and the type of refractory material used to line the furnace.

What is claimed is:

1. A method of use of an ash derived from the combustion of waste paper pulp or sludge from paper production industry in steel making to remove unwanted impurities from molten metal, the method comprising providing the ash derived from the combustion of waste paper pulp or sludge as at least a partial component of an artificial virgin slag for use in steel making and thereby removing unwanted impurities, wherein further components of the slag comprise lime and/or magnesia.

2. A method of making a steel-making slag, the method comprising adding the ash derived from the combustion of waste paper pulp or sludge from paper production industry and lime- and/or magnesia-containing materials into a steel-making furnace or other vessel containing liquid steel, wherein at least some lime-and/or magnesia-containing materials are added to ensure that the steel-making slag has a basicity ratio (V) appropriate for use in steel making.

* * * * *